United States Patent
Mongrolle et al.

(10) Patent No.: US 10,274,253 B2
(45) Date of Patent: Apr. 30, 2019

(54) DRYING SYSTEM

(71) Applicant: Saint-Gobain Placo SAS, Suresnes (FR)

(72) Inventors: Jean-Louis Mongrolle, Bassens (FR); Jerome Lalande, Paris (FR); Martin Goodaire, Coventry (GB); Stephen Selby, Coventry (GB)

(73) Assignee: Saint-Gobain Placo SAS (FR)

( * ) Notice: Subject to any disclaimer, the term of this patent is extended or adjusted under 35 U.S.C. 154(b) by 663 days.

(21) Appl. No.: 14/650,287

(22) PCT Filed: Dec. 5, 2013

(86) PCT No.: PCT/EP2013/075696
§ 371 (c)(1),
(2) Date: Jun. 5, 2015

(87) PCT Pub. No.: WO2014/086936
PCT Pub. Date: Jun. 12, 2014

(65) Prior Publication Data
US 2015/0308739 A1     Oct. 29, 2015

(30) Foreign Application Priority Data
Dec. 5, 2012   (EP) .................................... 12290428

(51) Int. Cl.
| F26B 3/00 | (2006.01) |
| F26B 3/04 | (2006.01) |
| F26B 15/12 | (2006.01) |
| F26B 21/00 | (2006.01) |
| F26B 15/18 | (2006.01) |
| F26B 23/00 | (2006.01) |

(52) U.S. Cl.
CPC ................ *F26B 3/04* (2013.01); *F26B 15/12* (2013.01); *F26B 15/18* (2013.01); *F26B 21/004* (2013.01); *F26B 23/001* (2013.01); *F26B 23/005* (2013.01); *Y02P 70/405* (2015.11)

(58) Field of Classification Search
CPC .. F26B 3/04; F26B 3/082; F26B 13/14; F26B 15/04; F26B 21/004; F26B 23/001; F26B 25/20
USPC ......... 34/443, 444, 445, 451, 459, 481, 500, 34/501, 86
See application file for complete search history.

(56) References Cited

U.S. PATENT DOCUMENTS

| 4,467,537 A | 8/1984 | Trotscher |
| 5,111,739 A * | 5/1992 | Hall .......................... F24F 7/06 454/296 |

(Continued)

FOREIGN PATENT DOCUMENTS

| EP | 0448983 A2 | 10/1991 |
| FR | 2967486 A1 * | 5/2012 ................ F26B 3/30 |
| WO | 2004101238 A2 | 11/2004 |

*Primary Examiner* — John P McCormack
(74) *Attorney, Agent, or Firm* — GrayRobinson, P.A.; Michael J. Colitz, III

(57) ABSTRACT

A drier for drying boards (32) comprises at least one conduit (34, 40) for directing airflow towards one of the faces of the board (32). The drier is configured such that at least a portion of the airflow travels across the face of the board (32) along the longitudinal axis of the drier, the longitudinal axis of the drier being the axis along which the board (32) travels as it is dried.

11 Claims, 2 Drawing Sheets

(56) References Cited

U.S. PATENT DOCUMENTS 6,581,302 B1   6/2003  Philipp et al.
2008/0086905 A1*  4/2008  Yanes .................. F26B 13/007
                                                          34/446

* cited by examiner

DRYING SYSTEM

CLAIM OF PRIORITY

This application is a continuation of and claims priority under 35 U.S.C. § 371 to International Application No. PCT/EP2013/075696 filed on Dec. 5, 2013, which in turn claims priority to EP 12290428.7 filed on Dec. 5, 2012. The contents of both these applications are incorporated herein by reference for all purposes.

The present invention relates to drying systems for drying boards, in particular for drying gypsum plasterboards.

Gypsum wallboard is well-known for use in the construction industry, e.g. for providing linings for walls, ceilings, lift-shafts and corridors.

The term "gypsum", as used herein, refers to calcium sulphate in a stable dihydrate state ($CaSO_4.2H_2O$), and includes the naturally occurring mineral, the synthetically derived equivalents, and the dihydrate material formed by the hydration of anhydrite or stucco (calcium sulphate hemihydrate).

Gypsum is capable of being dehydrated to form plaster, which can subsequently be rehydrated and cast, moulded or otherwise formed to useful shapes, such as boards.

Gypsum is generally prepared for use as plaster by grinding and calcining at relatively low temperature (such as from about 120 to 170° C.), generally at atmospheric pressure. This results in partially dehydrated gypsum, typically in the form of the beta crystalline form of the hemihydrate. The partially dehydrated gypsum may be used as a building or construction material by mixing it with water to form an aqueous stucco slurry, paste or dispersion, and then allowing the slurry to set by re-crystallisation from the aqueous medium.

In the production of gypsum boards, slurry is typically deposited on a liner e.g. a paper sheet, and is covered with a further liner, such that the slurry is sandwiched between the two liners. This sandwich structure is then passed through a pair of forming plates or rolls that determine the thickness of the board. After this, the structure passes along a conveyor line, to allow time for the stucco slurry to hydrate and harden. The hardened structure is cut to provide multiple boards of the desired length and these are transferred to a drying system to allow excess water to evaporate.

It is known to provide drying systems having conduits that direct airflow in a longitudinal direction of the system, that is, in the direction of travel of the gypsum board.

It is also known to provide drying systems having conduits that direct airflow towards one of the faces of the board. In such cases, the flow patterns are such that after leaving the conduit, air tends to travel along the surface of the board in a transverse direction of the system. These systems tend to have multiple conduits that are spaced along the length of the system.

The drying system is typically made up of a series of drying chambers, each of which provides heated airflow that is directed towards the main faces of the board. Typically, a board travels through each of the drying chambers in turn, supported and conveyed by a roller array. Thus, each board passes along the temperature profile of the drying system.

It is desirable for drying systems to be provided that have one or more of the following attributes:
they dry the boards more evenly;
they have a reduced spatial requirement (that is, a reduced footprint and/or fewer drying chambers);
they have reduced energy requirements.

Therefore, at its most general, the present invention may provide a drier for drying boards, the drier comprising at least one conduit for directing airflow towards one of the faces of the board, the drier being configured such that at least a portion of the airflow travels across the face of the board along the longitudinal axis of the drier (in either direction along this axis). In the present specification, the longitudinal axis of the drier denotes the axis along which the board travels as it is dried. Preferably, airflow occurs predominantly along this axis.

By promoting longitudinal airflow across the face of the board, it may be possible to dry the board more evenly, since the variation in the distance travelled by the airflow over different portions of the board face is reduced. Furthermore, by aligning airflow with the longitudinal axis of the drier, it may be possible to increase the contact time between the air and the underlying boards, thus increasing drying rates.

Typically, a plurality of conduits are provided at intervals along the longitudinal direction of the drier. The drier is configured such that air exiting the conduit is drawn into the space between adjacent conduits, thus promoting longitudinal flow over the surfaces of the boards.

In a first aspect, the present invention may provide a drier for drying a board, the board having two faces that are opposed to each other, the drier comprising:
rollers for conveying the board along a longitudinal direction of the drier, the rollers further being for supporting the board in a support plane containing the longitudinal direction of the drier;
air inflow means for directing airflow towards the faces of the board, the air inflow means comprising a lower conduit and a upper conduit, the lower and upper conduits extending transversely to the longitudinal direction of the drier, the lower conduit having a plurality of apertures for directing airflow towards an underside of the board and the upper conduit having a plurality of apertures for directing airflow towards an upper side of the board;
wherein the combined cross-sectional area of the upper and lower conduits at their respective airflow inlets is at least 40% of the unit area of the drier, the unit area being a quadrilateral having:
one side equal to the distance between the axis of the roller immediately preceding the lower conduit, in the direction of travel of the board, and the axis of the roller immediately following the lower conduit, in the direction of travel of the board; and
another side equal to the distance between the uppermost portion of the upper conduit and the lowermost portion of the lower conduit.

Preferably, the combined cross-sectional area of the upper and lower conduits is at least 45% of the unit area, more preferably at least 50%.

By providing larger conduits, relative to the space available between adjacent rollers, the size of the gaps between the conduits and the boards may be decreased and/or the size of the surface of the conduit that is opposed to the respective face of the board may be increased, thus assisting in channelling airflow in a longitudinal direction of the drier.

Typically, the width of the lower conduit in the longitudinal direction of the drier is less than the width of the upper conduit in the longitudinal direction of the drier. This helps to maximise the surface of each conduit that is opposed to the respective face of the board, thus further promoting longitudinal airflow. The width of the lower conduit is constrained by the presence of the rollers supporting the board, while the width of the upper conduit is not.

Typically, the conduits each have a planar face facing towards the support plane. For example, the conduits may each have a substantially rectangular cross-section, having e.g. rounded corners.

Typically, at a given distance along the transverse direction of the drier, the cross-sectional area of the lower and upper conduits is the same. This allows similar drying rates to be achieved for the upper and lower faces of the boards, since they each experience similar levels of airflow.

In general, the width of the lower conduit in the longitudinal direction of the drier is less than 90% of the width of the upper conduit in the longitudinal direction of the drier, preferably less than 80%, more preferably less than 75%.

Preferably, the drier comprises a panel that is aligned with the longitudinal direction of the drier and intersects the support plane. Such a panel is typically provided at the downstream end of the conduits (the downstream end of the conduit being distal to the air inlet of the conduit). Often, a further panel is provided at the upstream end of the conduits. Such panels may help to inhibit air exit in a lateral direction of the drier (that is, a transverse direction of the drier), thus promoting airflow along the faces of the boards in a longitudinal direction of the drier.

Preferably, the panel provides a continuous plate extending the whole length of the drier. Typically, the cross-sectional area of one or both of the lower and upper conduits decreases in a transverse direction of the drier, for at least part of the length of the conduit. This decrease preferably occurs in the direction of airflow along the conduit. Preferably one or both of the conduits displays a continuous taper in a downstream direction of the conduit. Thus, a three-dimensional space is provided on the outside of the conduits, this space having a cross-section that tapers in the opposite direction to the conduits. This tapered configuration may help to reduce any pressure differential along the length of the one or more conduits.

A pressure differential along the length of the conduits would tend to cause an air current to be formed externally to the conduit, flowing from relatively high pressure apertures to relatively low pressure apertures. That is, air exiting the conduits would tend to flow along the external surface of the conduits, in a transverse direction of the drier.

Thus, by reducing the pressure gradient, it may be possible to promote airflow in a longitudinal direction of the drier.

In general, the apertures provided in the lower conduit are distributed along the lateral portions of the conduit. For example, at least 90% (preferably 95%) of the plurality of apertures provided in the lower conduit may be distributed within two bands extending along the length of the conduit, the bands being provided in the lateral portions of the conduit and being separated by a central strip comprising at least 55% (preferably 65%) of the width of the conduit. This arrangement helps to promote airflow along the longitudinal direction of the drier.

In general, the drier comprises multiple sets of rollers, each set of rollers defining a respective support plane and having associated with it air inflow means for directing airflow towards the respective support plane. In this way, the drier provides multiple drying levels that allow multiple boards to be dried at the same time. In this case, the unit area typically corresponds to size of a repeating unit of the drier, that is, e.g. a quadrilateral having one roller at each of its corners and enclosing an upper conduit and a lower conduit.

In general, the drier is provided as part of a larger drying system comprising multiple driers. In this case, each drier is housed in a respective drying chamber, and the system is configured such that boards are conveyed through the drying chambers in turn. The drying system is generally configured to dry the boards according to a pre-determined temperature profile. Thus, the boards may pass initially through a pre-drying zone in which the air inflow is heated e.g. by a heat exchanger, and which provides preliminary drying of the board at moderate temperatures. The boards may subsequently pass through a central drying zone in which higher temperatures are achieved through the use of gas burners. This may be followed by a finishing zone, in which the remaining water in the boards is driven off using moderate heat (provided e.g. by a heat exchanger).

Due to the greater drying efficiencies that may be achieved by individual driers of the first aspect of the present invention, it may be possible to reduce the temperatures required to dry the boards, at least in certain sections of the drying system. In this case, it may be possible to heat one part of a drying system using thermal energy recovered from another part of the system. For example, thermal energy may be recovered from the exhaust of a drying chamber in the central drying zone, for use in the lower temperature finishing zone.

Therefore, in a second aspect, the present invention may provide a drying system comprising a drier according to the first aspect of the invention, the system being configured such that the airflow directed by the air inflow means is heated using thermal energy recovered from an exhaust conduit provided within the system.

Typically, the system comprises a heat pump for transferring thermal energy from the exhaust to the air inflow. The use of a heat pump may further allow increased recovery of water from the exhaust, for re-use in other parts of the system, or in other parts of a larger plant comprising the system.

In a third aspect, the present invention may provide a drier for drying a board, the board having two principal surfaces that are opposed to each other, the drier comprising:
conveying means for conveying the board along a longitudinal direction of the drier, the conveying means further being for supporting the board in a support plane containing the longitudinal direction of the drier;
air inflow means for directing airflow towards at least one of the principal surfaces of the board; and
airflow control means comprising a panel that is aligned with the longitudinal direction of the drier and intersects the support plane, the panel being for enhancing airflow in the longitudinal direction of the drier.

Typically, the air inflow means comprises a conduit extending transversely to the longitudinal direction of the board, the conduit comprising a plurality of apertures for directing airflow towards the board. In general, the panel is provided within the drier at the downstream end of the conduit. A further panel may be provided at the upstream end of the conduit.

Typically, the cross-sectional area of the conduit decreases in a transverse direction of the drier. Thus, the conduit may taper e.g. in a downstream direction of the conduit.

The drier according to the third aspect of the invention may comprise one or more optional features of the drier according to the first aspect of the invention.

In a fourth aspect, the present invention may provide a drier for drying a board, the board having two principal surfaces that are opposed to each other, the drier comprising:
conveying means for conveying the board along a longitudinal direction of the drier, the conveying means further being for supporting the board in a support plane containing the longitudinal direction of the drier; and air inflow means for directing airflow towards at least an underside of the board, the air inflow means comprising a conduit extending transversely to the longitudinal direction of the board, the conduit comprising a plurality of apertures for directing airflow towards the underside of the board;

wherein at least 90% of the apertures are distributed within two bands extending along the length of the conduit, the bands being provided in the lateral portions of the conduit and being separated by a central strip comprising at least 55% of the width of the conduit.

By locating the apertures close to the sides of the conduit, air exiting the apertures tends to be directed down the sides of the conduit, rather than along the length of the conduit. This helps to promote airflow in a generally longitudinal direction of the drier.

The drier according to the fourth aspect of the invention may comprise one or more optional features of the drier according to the first aspect of the invention.

In a fifth aspect, the present invention may provide a drying system comprising a drier according to the third or fourth aspects of the invention, the system being configured such that the airflow directed by the air inflow means is heated using thermal energy recovered from an exhaust conduit provided within the system.

The invention will now be described by way of example with reference to the following Figures in which.

Figure 1:
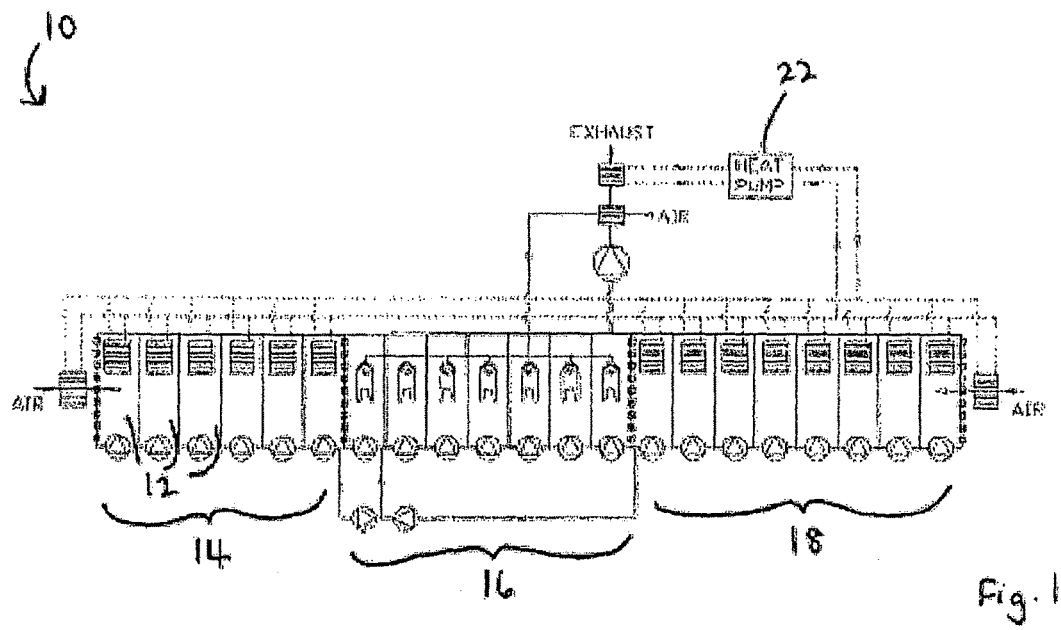
FIG. 1 is a schematic plan view of a drying system according to a first embodiment of the second aspect of the invention.

Referring to FIG. 1, a drying system 10 has multiple drying chambers 12 arranged in sequence. Gypsum boards to be dried pass along this sequence in turn, starting in a pre-drying region 14, before passing through a main drying region 16 and finally a finishing zone 18.

The main drying region 16 is heated using gas burners, while the chambers in the pre-drying and finishing regions 14, 18 are heated through heat exchangers. The heat exchangers use heat that is recovered from the exhaust of the main drying region 16. Thermal energy may be recovered from the exhaust of the main drying region 16 using a heat pump 22.

Figure 2:
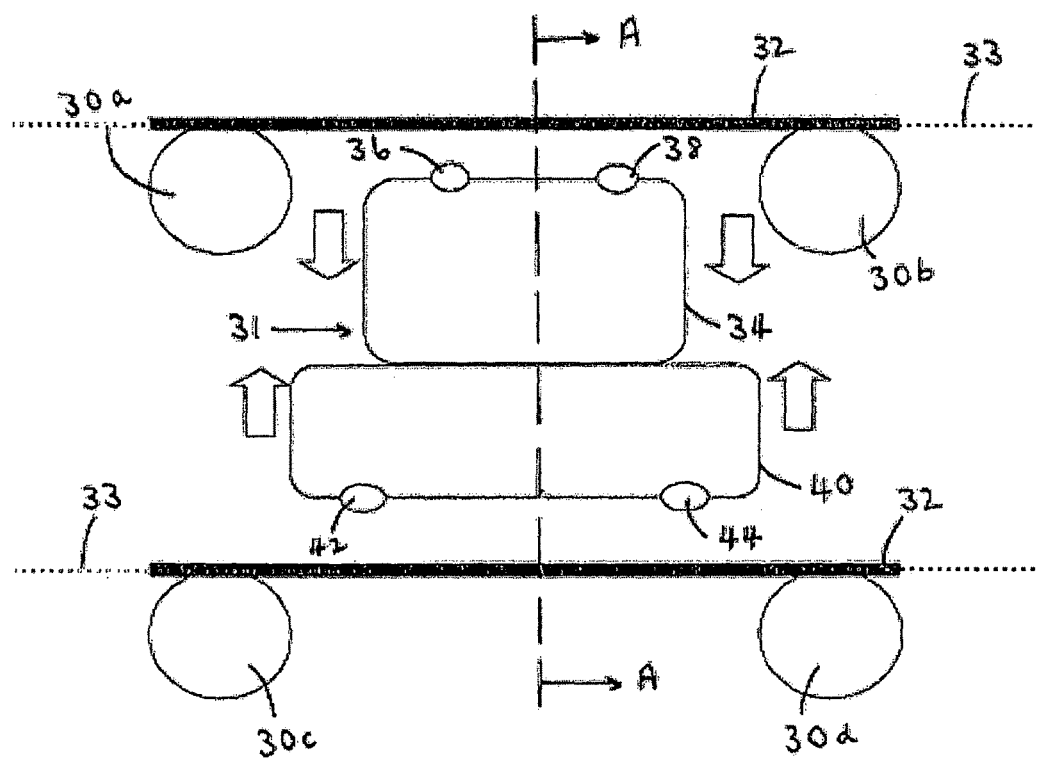
FIG. 2 is a schematic section view of part of a drier, according to a first embodiment of the first aspect of the invention.
Figure 3:
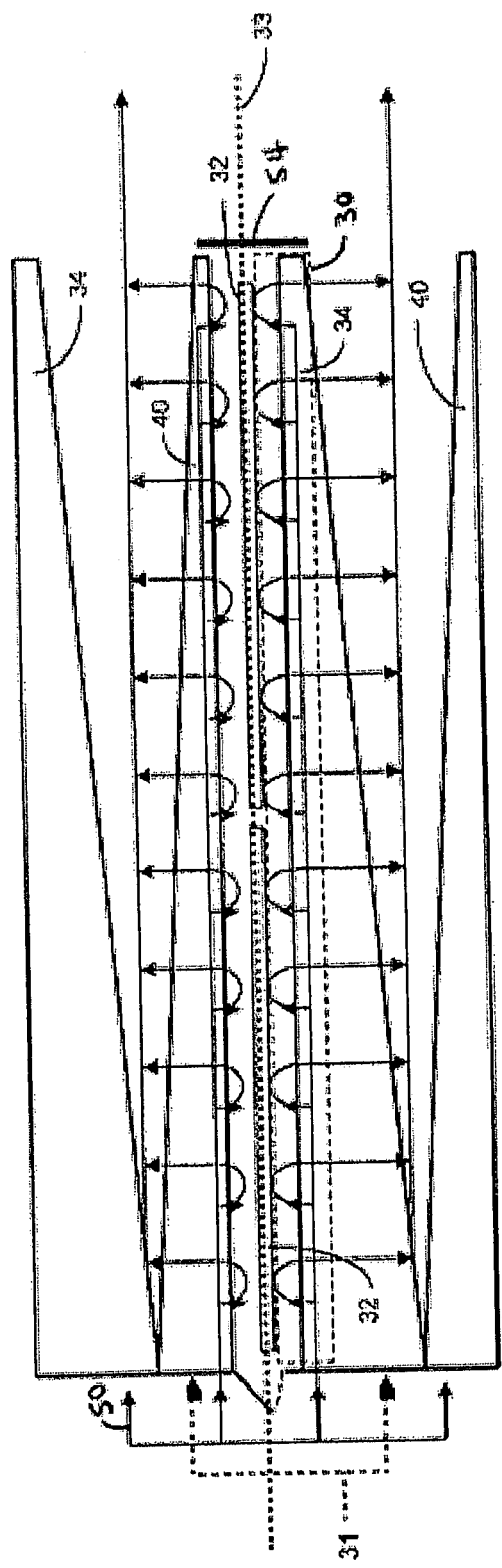
FIG. 3 is a schematic section view taken along the line A-A of FIG. 2 and including multiple drier levels.

Referring to FIGS. 2 and 3, a drier has rollers 30a, 30b that support a gypsum board and cause it to move through the drier (e.g. from left to right in FIG. 2). The rollers are provided in multiple sets 30, each set of rollers defining a different plane for supporting a respective board. A group of four rollers 30a, 30b, 30c, and 30d defines a unit area against which the cross-sectional area of the nozzle boxes is compared.

Lower nozzle boxes 34 provide airflow conduits for supplying heated air to the underside of a respective gypsum board 32 via apertures 36, 38. Upper nozzle boxes 40 provide airflow conduits for supplying heated air to the upper side of a respective board 32 via apertures 42, 44. The apertures are provided in the surface of the respective nozzle box that faces the board to be dried. The upper and lower nozzle boxes are aligned with the rollers 30a, 30b, such that they extend in a transverse direction of the drier (that is, into the plane of FIG. 2).

The terms "lower nozzle box" and "upper nozzle box" denote the position of the nozzle box relative to the board that experiences airflow from that nozzle box.

The upper and lower nozzle boxes 34, 40 are each provided with a set of multiple apertures, the set of multiple apertures extending along the length of the respective nozzle box. The apertures are provided in the face of the nozzle box that is opposed to the respective board.

The nozzle box further has sides that extend away from the respective board, towards the back face of the nozzle box.

At least 90% of the apertures provided on the lower nozzle box 34 are located within 30 mm of the sides of the nozzle box. Thus, at least 90% of the apertures are located within two bands extending adjacent to the sides of the nozzle box, and each band having a width that is about 18% of the total width of the nozzle box. This arrangement helps to ensure that air exiting the apertures 36, 38 flows towards the rollers and down the sides of the nozzle box. That is, air exiting the apertures of the lower nozzle box 34 initially flows in a generally longitudinal direction of the drier, rather than along the length of the nozzle boxes.

The upper nozzle boxes are about 40% wider than the lower nozzle boxes, and thus extend over a greater area of the respective gypsum board 32. This arrangement helps to ensure that air exiting the apertures 42, 44 flows towards the closest edge of the upper nozzle and up the sides of the nozzle. That is, air exiting the apertures of the upper nozzle initially flows in a generally longitudinal direction of the drier, rather than along the length of the nozzle boxes.

The width of the lower nozzle boxes 34 is such they each fit between an adjacent pair of rollers 30, 30b.

The height of the upper nozzle boxes 40 is less than that of the lower nozzle boxes 34, with the result that the cross-sectional area of the upper and lower nozzle boxes is the same. This helps to ensure a homogenous air distribution to both the upper and lower faces of the board.

Referring to FIG. 3, the upper and lower nozzle boxes 40, 34 are aligned with the rollers 30, and hence extend transversely to the direction of travel of the gypsum boards 32. Air enters the nozzle boxes at an air inlet 50, travels along the nozzle boxes and is directed towards the gypsum boards 32 by a plurality of apertures located on the face of the nozzle that is opposed to the respective gypsum board. The upper and lower nozzle boxes taper in a direction away from the air inlet 50, that is, in a downstream direction. However, the face of the nozzle box that is opposed to the respective gypsum board remains aligned with the gypsum board.

The taper of the upper and lower nozzle boxes 34, 40 helps to reduce the pressure differential along the length of the nozzle boxes, so as to reduce the extent to which air exiting the nozzle apertures tends to flow along the external length of the nozzle box. By reducing this effect, the configuration promotes airflow in a generally longitudinal direction of the drier.

The drier comprises an air inflow means 31 for directing airflow towards the principal surfaces of the board 32, the air inflow means 31 comprises a lower conduit 40 and a upper conduit 34, the lower and upper conduits 40,34 each having a substantially rectangular cross-section and each extending transversely to the longitudinal direction of the drier.

The rollers 30a,30b,30c,30d further being for supporting the board 32 in a support plane 33 containing the longitudinal direction of the drier.

A panel 54 extends in the direction of travel of the gypsum board, that is, into the plane of FIG. 3 and transversely to the nozzle boxes 34,40, and is provided at the downstream end of the nozzle boxes. The panel 54 helps to prevent air leaving the drier in the longitudinal direction of the rollers 30. Thus, the presence of the panel helps to reduce airflow along the length of the nozzle boxes and increase airflow in a generally longitudinal direction of the drier. Preferably, the panel is a mask.

The invention claimed is:

1. A drier for drying a board, the board having two principal surfaces that are opposed to each other, the drier comprising:
   rollers for conveying the board along a longitudinal direction of the drier, the rollers further being for supporting the board in a support plane containing the longitudinal direction of the drier;
   air inflow means for directing airflow towards the principal surfaces of the board, the air inflow means comprising a lower conduit and a upper conduit, the lower and upper conduits each having a substantially rectangular cross-section and each extending transversely to the longitudinal direction of the drier, the lower conduit having a plurality of apertures for directing airflow towards an underside of the board and the upper conduit having a plurality of apertures for directing airflow towards an upper side of the board;
   wherein the combined cross-sectional area of the upper and lower conduits at their respective airflow inlets is at least 40% of the unit area of the drier, the unit area being a quadrilateral having:
   one side equal to the distance between the axis of the roller immediately preceding the lower conduit, in the direction of travel of the board, and the axis of the roller immediately following the lower conduit, in the direction of travel of the board; and
   another side equal to the distance between the uppermost portion of the upper conduit and the lowermost portion of the lower conduit;
   wherein the width of the lower conduit in the longitudinal direction of the drier is less than the width of the upper conduit in the longitudinal direction of the drier;
   and further wherein the cross-sectional area of the lower and upper conduits at a given distance along the transverse direction of the drier is the same.

2. A drier according to claim 1, wherein said lower and upper conduits each have a planar face facing towards the support plane, the plurality of apertures associated with each respective conduit being provided in the respective planar face of that conduit,
   the planar face of the lower conduit being narrower than the planar face of the upper conduit.

3. A drier according to claim 2, wherein the width of the lower conduit in the longitudinal direction of the drier is less than 90% of the width of the upper conduit in the longitudinal direction of the drier.

4. A drier according to claim 1, further comprising a panel that is aligned with the longitudinal direction of the drier and intersects the support plane, the panel being for enhancing airflow in the longitudinal direction of the drier.

5. A drier according to claim 3, wherein a panel is provided at the downstream end of the conduits, relative to the direction of airflow along the conduits.

6. A drier according to claim 1, wherein the cross-sectional area of at least one of the lower and upper conduits decreases in a transverse direction of the drier.

7. A drier according to claim 5, wherein at least one of the lower and upper conduits has a cross section that decreases continuously in a transverse direction of the drier, for at least part of the length of the at least one conduit.

8. A drier according to claim 1, wherein at least 90% of the plurality of apertures provided in the lower conduit are distributed within two bands extending along the length of the conduit, the bands being provided in the lateral portion of the conduit and each band having a width that is about 18% of the total width of the conduit.

9. A drying system comprising a drier according to claim 1, the system being configured such that the airflow directed by the air inflow means is heated using thermal energy recovered from an exhaust conduit provided within the system.

10. A drying system according to claim 8, the system comprising a heat pump for transferring thermal energy from the exhaust to the air inflow means.

11. A system according to claim 8, wherein an exhaust conduit provides an outlet for steam generated by a drying chamber located up-stream or downstream of said drier.

* * * * *